(12) United States Patent
Li et al.

(10) Patent No.: US 9,152,250 B2
(45) Date of Patent: Oct. 6, 2015

(54) ELECTROMAGNETIC POINTER WITH NEW TYPE ADJUSTMENT STRUCTURE

(71) Applicant: Wacom Co., Ltd., Saitama (JP)

(72) Inventors: Chih-Jen Li, Hsinchu (TW); Chien-Chia Lien, Hsinchu (TW); A-Li Wong, Hsinchu (TW)

(73) Assignee: Wacom Co., Ltd., Saitama (JP)

( * ) Notice: Subject to any disclaimer, the term of this patent is extended or adjusted under 35 U.S.C. 154(b) by 8 days.

(21) Appl. No.: 13/947,708

(22) Filed: Jul. 22, 2013

(65) Prior Publication Data

US 2014/0055425 A1 Feb. 27, 2014

(30) Foreign Application Priority Data

Aug. 23, 2012 (TW) .............................. 101130724 A

(51) Int. Cl.
  *G06F 3/0354* (2013.01)
  *G06F 3/033* (2013.01)
  *G06F 3/046* (2006.01)

(52) U.S. Cl.
  CPC ............ *G06F 3/03545* (2013.01); *G06F 3/046* (2013.01)

(58) Field of Classification Search
  USPC ................................. 345/179, 184
  See application file for complete search history.

(56) References Cited

U.S. PATENT DOCUMENTS

| 5,565,632 A | 10/1996 | Ogawa |
| 5,581,052 A * | 12/1996 | Padula et al. .............. 178/19.04 |
| 6,853,369 B2 | 2/2005 | Fukushima et al. |
| 2004/0125089 A1* | 7/2004 | Chao et al. .................... 345/179 |
| 2011/0175854 A1* | 7/2011 | Lien et al. .................... 345/179 |

FOREIGN PATENT DOCUMENTS

| JP | 2004-209881 A | 7/2004 |
| TW | 385746 U | 8/2010 |

OTHER PUBLICATIONS

Taiwanese Office Action dated Jan. 8, 2015, for corresponding TW Application No. 101130724, 7 pages.

* cited by examiner

*Primary Examiner* — Robin Mishler
(74) *Attorney, Agent, or Firm* — Seed IP Law Group PLLC

(57) ABSTRACT

An electromagnetic pointer with a new type adjustment structure is disclosed. The electromagnetic pointer comprises at least one pen tube assembly, a tuning component at one end of the pen tube assembly, a pen tip, a core holder configured in the pen tube assembly with a surrounding coil, a ferrite core, an elastomer, a touch pin configured in the core holder and the pen tube assembly and a circuit board. The tuning component is configured to move axially along the pen tube assembly to perform tuning.

8 Claims, 2 Drawing Sheets

ELECTROMAGNETIC POINTER WITH NEW TYPE ADJUSTMENT STRUCTURE

CROSS-REFERENCE TO RELATED APPLICATIONS

The entire contents of Taiwan Patent Application No. 101130724, filed on Aug. 23, 2012, from which this application claims priority, are incorporated herein by reference.

FIELD OF THE INVENTION

The present invention generally relates to an electromagnetic pointer, more particularly to an electromagnetic pointer with an adjustable structure.

BACKGROUND OF THE INVENTION

Input apparatuses or electronic appliances such as smart mobile devices (Smart Phone), digitizers or tablets or e-books/green books include a plurality of antennas or sensor coils forming a sensing plane arranged under a work surface of the digitizer tablet or a screen of the e-book, and a pointer for a user to operate the input apparatuses or electronic appliances. The coordinates of the pointer are obtained through the transmitting and receiving of electromagnetic waves between the circuit of the pointer and the antennas or the sensor coils.

The circuit of the pointer including electromagnetic pens or styluses usually comprises an inductor, a capacitor and relative components enclosed in a case. The inductor constituted by a ferrite core winded with a metal coil and the capacitor constitute the circuit to transmit and receive electromagnetic waves with the antennas or sensor coils. The frequency variation of the circuit is achieved via changing the capacitance and the inductance so that the design of the pointer can choose either the inductor or capacitor to be variable or adjustable according to the requirement.

Through the variation of contact force of the tip of an electromagnetic pen or a stylus applied upon a digitizer or tablet, the pen core is displaced to moved the ferrite core inside the metal coil as well as related components and to press and deform an elastic material such as rubber to change the inductance, capacitance and frequency of electromagnetic signals. U.S. Pat. Nos. 5,565,632 and 6,853,369 disclose such kind of electromagnetic pen.

U.S. Pat. No. 5,565,632 discloses that the inductance and frequency of the electromagnetic pen are changed through the relative displacement of a small ferrite core ahead a large ferrite core with a winding coil. U.S. Pat. No. 6,853,369 shows an electromagnetic pen design with a sensitive variable capacitor which is able to be changed via the variation of the force of the pen core applied, and the frequency is changed according to the capacitance of the variable capacitor.

The disadvantage of the electromagnetic pen disclosed in U.S. Pat. No. 5,565,632 includes incline angle distortion and coordinate fluctuation of the electromagnetic pen. The problem of incline angle distortion results from the variation of the distribution of magnetic lines when the small ferrite core moves ahead the winding coil. The problem of coordinate fluctuation is induced by the variation of the amplitudes of electromagnetic signals when the small ferrite core moves ahead the winding coil. Moreover, the illustrated design lacks an adjustable structure to adjust possible frequency deviation.

The disadvantage of the electromagnetic pen taught an U.S. Pat. No. 6,853,369 includes inaccurate frequency induced by unavoidable manufacturing tolerances of dimensions (length or height) and lack of a remedial design of adjustable structure.

Furthermore, for most input apparatuses such as digitizer tablets, the size of the pointer, particularly the diameter of the pointer, is not specifically required small and has a similar size with ordinary pens for writing. Instead, the pointer must have a relative larger size than that of the ordinary pens for enclosing necessary circuit and components. However, for electronic appliances such as smart phones, mobile communication devices e-books/green books or other portable electronic devices with a limited thickness which have to accommodate the pointer inside, the size of the pointer, particularly the diameter of the pointer, must be small enough for being accommodated inside the electronic appliance.

In view of the problems of manufacturing techniques and design of the conventional pointer devices, the invention provides an electromagnetic pointer to solve these issues.

BRIEF SUMMARY OF THE INVENTION

One object of the invention is to provide an electromagnetic pointer with an adjustable structure which can adjust the possible gaps between the components inside the electromagnetic pointer due to tolerances of dimensions or assembling to eliminate unnecessary error. The force needed to perform the writing function applied upon the electromagnetic pointer is able to be set by adjusting the degree of screwing tightness of the core holder.

The invention provides an electromagnetic pointer with an adjustment structure. The electromagnetic pointer comprises at least one pen tube assembly, a tuning component at one end of the pen tube assembly, a pen tip, a core holder configured in the pen tube assembly with a surrounding coil, a ferrite core, an elastomer, a touch pin configured in the core holder and the pen tube assembly and a circuit board. The tuning component is configured to move axially along the pen tube assembly to perform tuning. The pen tip in the pen tube assembly extends out from the tuning component. The ferrite core is configured in the core holder and the pen tube assembly and contacts the pen tip. The elastomer is located between the ferrite core and the touch pin, one end of the touch pin extends out from the core holder. A first end of the circuit board comprises a plurality of conductive terminals adjacent the touch pin, an elastic conductive device is configured to be located between the conductive terminals and the touch pin, and the surrounding coil connects the circuit board.

DETAILED DESCRIPTION OF THE INVENTION

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well known process operations are not described in detail in order not to unnecessarily obscure the present invention.

Figure 1:
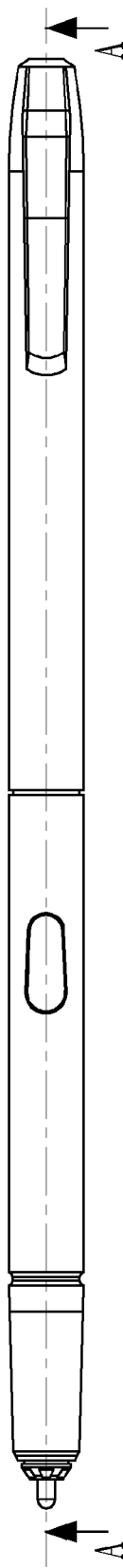
FIG. 1 shows an electromagnetic pointer with an adjustable structure according one embodiment of the present invention.
Figure 1A:
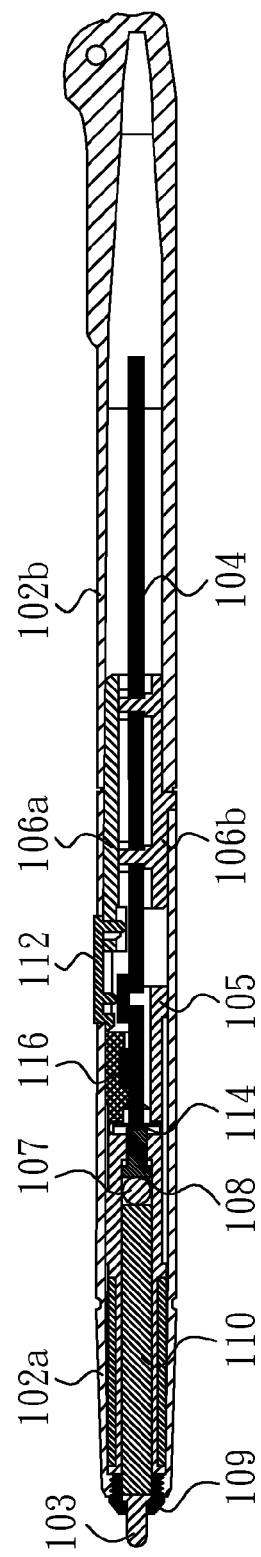
FIG. 1A shows a cross-sectional view of an electromagnetic pointer according one embodiment of the present invention.

FIG. 1 shows an electromagnetic pointer with an adjustable structure according one embodiment of the present invention. FIG. 1A shows a cross-sectional view of an electromagnetic pointer according one embodiment of the present invention. The electromagnetic pointer 100 comprises pen tube assemblies 102a and 102b, a pen tip 103, a circuit board 104, a core holder 105, a holder 116, holders 106a and 106b, an elastomer 107, a touch pin 108, a tuning component 109, a ferrite core 110 and a switch 112. The pen tube assemblies 102a and 102b comprise hollow pen shell components made of non-metal materials to accommodate the circuit board 104, the core holder 105, the holder 116, the holders 106a and 106b, the elastomer 107, the touch pin 108, and the ferrite core 110. The diameters of the pen tube assemblies 102a and 102b are smaller than about 6 mm, and is preferably about 5.5 mm, but is not limited to 5.5 mm.

In one embodiment of the invention, the circuit board 104 comprises a printed circuit board with a LC circuit and a controller so that the electromagnetic pointer is able to transmit electromagnetic signals to an electromagnetic input apparatus, or to receive electromagnetic signals from electromagnetic antenna loops or sensor coils of the electromagnetic input apparatus. The electromagnetic input apparatus comprises a smart mobile communication devices, digitizer or tablet or eBook.

In one embodiment of the invention, the tuning component 109 is hollow. The pen tip 103 penetrates through the tuning component 109. The tuning component 109 comprising a hollow screw has a thread configured to join with a thread inside the pen tube assembly 102a so that the tuning component 109 is able to be screwed in to the tip end of the pen tube assembly 102a. The inner diameter of one end of the tuning component 109 toward the pen tip 103 is smaller than the inner diameter of the other end. The pen tip 103 has a first end for contacting an electromagnetic input apparatus and a second end with a larger diameter. The diameter of the second end of the pen tip 103 is larger than the inner diameter of the end of the tuning component 109 toward the pen tip 103 so that the pen tip 103 is partially confined in the tuning component 109 without completely through the tuning component 109 and falling down when the pen tip 103 is through the tuning component 109.

In one embodiment of the invention, the ferrite core 110 is located in the hollow pen tube assembly 102a and adjacent to the pen tip 103. The hollow core holder 105 is located in the pen tube assembly 102a for confining and restricting the ferrite core 110 inside the core holder 105 so that the ferrite core 110 is able to slide inside the core holder 105. The elastomer 107 and the touch pin 108 are configured to be located in the core holder 105. The elastomer 107 is configured to be located between the ferrite core 110 and the touch pin 108. The inner diameter of a first end of the core holder 105 toward the pen tip 103 is larger than that of a second end of the core holder 105. The diameter of a first end of the touch pin 108 toward the pen tip 103 is larger than that of a second end of the touch pin 108. The diameter of the second end of the touch pin 108 is larger than the inner diameter of the second end of the core holder 105 so that the touch pin 108 is restricted in the core holder 105 when the touch pin 108 penetrates the core holder 105.

In one embodiment of the invention, the circuit board 104 is configured to be secured in the pen tube assemblies 102a and 102b via the holder 116, the core holder 105 and the holder 106a and 106b. The first end of the circuit board 104 toward the pen tip 103 of the electromagnetic pointer has a plurality of conductive terminals. A elastic conductive device is configured to be located between the circuit board 104 and the touch pin 108. The conductive terminals of the circuit board 104 are electrically connected through the elastic conductive device after the touch pin 108 pushes the elastic conductive device. Detail content will be further described in the following description. The switch 112 is configured to be located on the circuit board 104 and extend out from the tube assembly 102a. The switch 112 is used as a switch of the circuit board 104.

Figure 2:
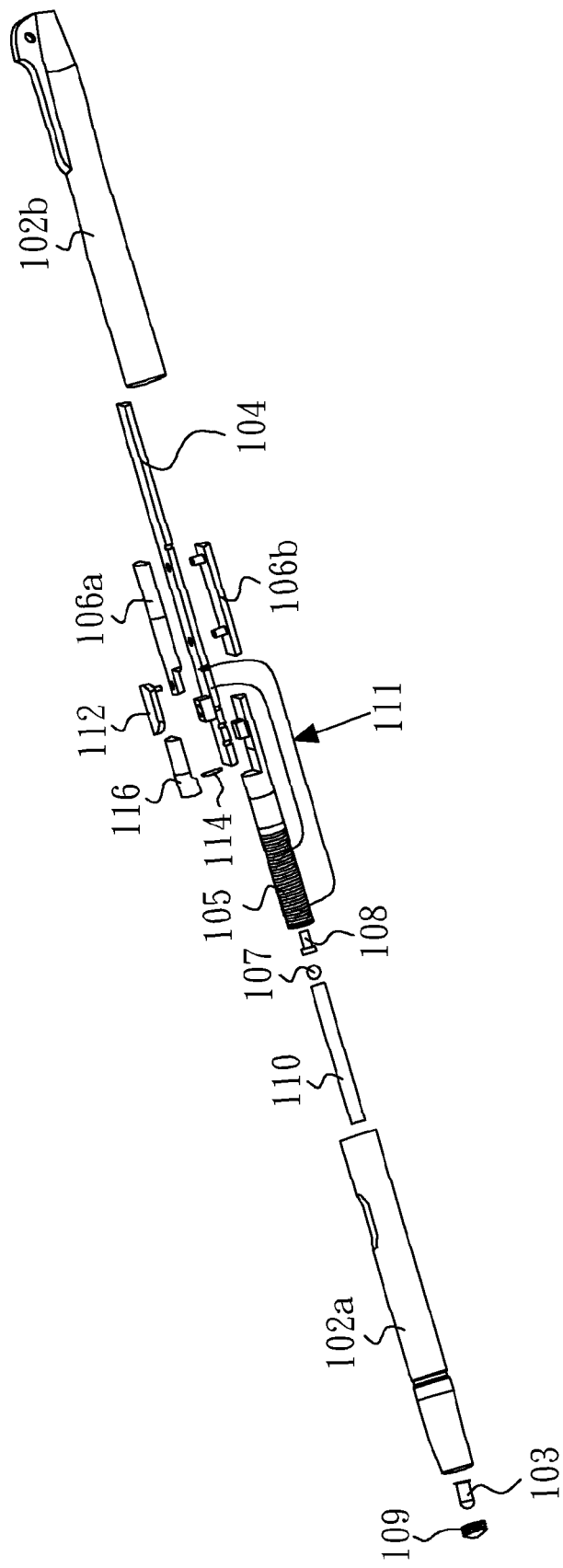
FIG. 2 shows an exploded view of an electromagnetic pointer according one embodiment of the present invention.

FIG. 2 shows an exploded view of an electromagnetic pointer according one embodiment of the present invention. The electromagnetic pointer with an adjustable structure according one embodiment of the present invention can be further understood by referring to both FIG. 1A and FIG. 2. As shown in FIG. 2, the pen tip 103 penetrates through the tuning component 109 so that the pen tip 103 is able to slide through the tuning component 109. The tuning component 109 is configured to be located at a first end of the pen tube assembly 102a toward the pen tip 103 and is able to move axially for tuning. The ferrite core 110 is located in the hollow pen tube assembly 102a and adjacent to the pen tip 103. The elastomer 107 and the touch pin 108 are configured to be located after the ferrite core 110 and in the core holder 105. The elastomer 107 is configured to be located between the ferrite core 110 and the touch pin 108. The touch pin 108 is configured to be able to slide and being restricted in the core holder 105. When the core holder 105, the holder 116, the switch 112, the holders 106a and 106b and the circuit board 104 are configured to be secured in the pen tube assemblies 102a and 102b, the pen tip 103, the ferrite core 110, the elastomer 107 and the touch pin 108 are configured to be restricted inside the space constituted by the tuning component 109, the pen assembly 102a and the core holder 105.

In one embodiment of the invention, since the space constituted by the pen tube assembly 102a and the core holder 105 is constant, the moving distance of the pen tip 103, the ferrite core 110 and the ferrite core 108 is directly related to the compressibility of the elastomer 107. However, since the tuning component 109 is configured to be located at the first end of the pen tube assembly 102a toward the pen tip 103 and is able to be moved axially, the tuning component 109 is able to be used to adjust the size of the space constituted by the tuning component 109, the pen tube assembly 102a and the core holder 105, or the moving distance of the pen tip 103, the ferrite core 110 and the touch pin 108, or the degree of compression of the elastomer 107.

In one embodiment of the invention, a elastic conductive device 114 is configured to be located in the holder 116 and the core holder 105, and between the conductive terminals of the circuit board 104 and the end of the touch pin 108 extending out from the core holder 105. The elastic conductive device 114 alters the status of contact with the conductive terminals of the circuit board 104 via the pushing of the end of the touch pin 108 extending out from the core holder 105 so as to connect the conductive terminals of the circuit board 104 and change the circuitry and electric properties (such as LC oscillation frequency) of the circuit board 104.

In one embodiment of the invention, the elastic conductive device 114 comprises a thin cone spring or a conductive rubber, but is not limited to a cone spring or a conductive rubber. In one embodiment which the conductive device 114 is a cone spring, when one end of the touch pin 108 pushes the cone spring, the center of the cone spring will contacts the conductive terminals on one end of the circuit board 104 to electrically connect the conductive terminals and the change the circuitry and electric properties (such as LC oscillation frequency) of the circuit board 104. The electrically connection between the conductive terminals is able to be used to initiate the writing function of an electromagnetic pointer or a stylus, but is not limited to initiate the writing function.

In one embodiment of the invention, a conductive coil 111 is configured to wind the core holder 105, the conductive coil 111 is configured to be connected to the circuit of the circuit board 104. The conductive coil 111, the ferrite core 110 constitute a variable inductor when the ferrite core 110 is moving in the conductive coil 111. The variable inductor is configured to be connected to the LC circuit of the circuit board 104. The variable inductor and capacitors on the circuit board 104 constitute an oscillation circuit with a variable frequency. The variable inductor generates induced current to change the inductance or the frequency of the oscillation circuit via the relative displacement between the ferrite core 110 and the conductive coil 111 generated by the axial movement of the pen core 110 inside the core holder 105 with the winding conductive coil 111. The variation of the frequency is able to be used to change the line width of the trace of an electromagnetic pointer or a stylus, but is not limited to the line width of the trace.

In one embodiment of the invention, the switch 112 is configured to partially penetrate through the opening of the pen tube assembly 102a and to be located on the circuit board 104 as a switch of a circuit function thereof. The switch 112 is configured to be used as the switch of writing or erasing functions of the electromagnetic pointer or a stylus, but is not limited to writing or erasing functions.

It is noted that the embodiments of the invention focus on the configuration of the electromagnetic pointer rather than the function thereof. Thus the configuration of the embodiments of the invention is able to be applied any function of the electromagnetic pointer according to various requirements. The function which the configuration of the embodiments of the invention is applied to perform depends on circuit design.

In one embodiment of the invention, the elastomer 107 comprises, but is not limited to, rubber or other elastic material. The tuning component 109 comprises, but is not limited to, a screw and a thread inside an electromagnetic pointer. When an electromagnetic pointer or a stylus are in use, a contact force is applied upon one end of the pen tip 103 and is transferred to the other end of the pen tip 103 and the ferrite core 110. The ferrite core 110 compresses the elastomer 107 and pushes the touch pin 108. The touch pin 108 pushes the elastic conductive device 114 to alter the contact status between the conductive terminals of the circuit board 104 and the elastic conductive device 114 to initiate the function of the electromagnetic pointer such as the writing function.

When the electromagnetic pointer is not in use, there is a gap between the touch pin 108 and the elastic conductive device 114, and the adjustment of the gap is performed through adjusting the tuning component 109. As mentioned above, the tuning component 109 is able to be used to adjust the size of the space constituted by the tuning component 109, the pen tube assembly 102a and the core holder 105, or the moving distance of the pen tip 103, the ferrite core 110 and the touch pin 108, or the degree of compression of the elastomer 107, or the length of the touch pin 108 extending out from the core holder 105, or the gap between the touch pin 108 and the elastic conductive device 114.

Since the tuning component 109 can be used outside the electromagnetic pointer, the gap between the touch pin 108 and the elastic conductive device 114 can be adjusted anytime. The tuning component 109 tunes all movable components of the electromagnetic pointer or stylus so that the gap between the components induced from the tolerance or assembling is able to be adjusted by the tuning component 109 to eliminate unnecessary error. The force needed to perform the writing function applied upon the electromagnetic pointer is able to be set by adjusting the degree of screwing tightness of the tuning component 109 and the degree of compression of the elastomer 107.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An electromagnetic pointer with an adjustment structure, comprising:
   at least one pen tube assembly;
   a tuning component at one end of the pen tube assembly, the tuning component comprising a hollow screw configured to join with a thread inside the pen tube assembly so that the tuning component is able to be screwed into the pen tube assembly and move axially along the pen tube assembly to perform tuning;
   a pen tip in the pen tube assembly extending out from the tuning component;
   a core holder being configured in the pen tube assembly with a surrounding coil;
   a ferrite core being configured in the core holder and the pen tube assembly and contacting the pen tip;
   an elastomer and a touch pin being configured in the core holder and the pen tube assembly, the elastomer being located between the ferrite core and the touch pin, one end of the touch pin extending out from the core holder; and
   a circuit board, a first end of the circuit board comprising a plurality of conductive terminals adjacent the touch pin, an elastic conductive device comprising a cone spring formed in a conical shape and being located between the conductive terminals and the touch pin, a periphery of a base of the cone spring being in electrical contact with a peripheral one of the conductive terminals, and the surrounding coil connecting to the circuit board;
   wherein when the touch pin moves axially inside the core holder and the pen tube assembly between an extended position and a retracted position, the center of the cone spring correspondingly moves between a first position, at which it is not in electrical contact with a central one of the conductive terminals of the circuit board, and a second position, at which it is pushed by the touch pin to come in electrical contact with said central one of the conductive terminals, to thereby alter an electrical contact status between the peripheral one and the central one of the conductive terminals.

2. The electromagnetic pointer of claim 1, wherein a diameter of the pen tube assembly is smaller than about 6 mm, and is preferably about 5.5 mm.

3. The electromagnetic pointer of claim 1, wherein the elastomer comprises rubber.

4. The electromagnetic pointer of claim 1, wherein the electromagnetic pointer is used with a smart mobile communications device, a digitizer or a tablet or an eBook.

5. An electromagnetic pointer with an adjustment structure used with an electromagnetic input apparatus, comprising:
   first and second pen tube assemblies;
   a tuning component at one end of the first pen tube assembly, the tuning component comprising a hollow screw configured to join with a thread inside the first pen tube assembly so that the tuning component is able to be screwed into the first pen tube assembly and move axially along the first pen tube assembly to perform tuning;
   a pen tip in the first pen tube assembly extending out from the tuning component;
   a core holder being configured in the first pen tube assembly with a surrounding coil;
   a ferrite core being configured in the core holder and the first pen tube assembly and contacting the pen tip;
   an elastomer and a touch pin being configured in the core holder and the first pen tube assembly, the elastomer being located between the ferrite core and the touch pin, one end of the touch pin extending out from the core holder; and
   a circuit board, a first end of the circuit board comprising a plurality of conductive terminals adjacent the touch pin, an elastic conductive device comprising a cone spring formed in a conical shape and being located between the conductive terminals and the touch pin, a periphery of a base of the cone spring being in electrical contact with peripheral one of the conductive terminals, and the surrounding coil connecting to the circuit board, wherein the first and the second pen tube assemblies combine to accommodate the circuit board; and
   wherein when the touch pin moves axially inside the core holder and the first pen tube assembly between an extended position and a retracted position, the center of the cone spring correspondingly moves between a first position, at which it is not in electrical contact with a central one of the conductive terminals of the circuit board, and a second position, at which it is pushed by the touch pin to come in electrical contact with said central one of the conductive terminals, to thereby alter an electrical contact status between the peripheral one and the central one of the conductive terminals.

6. The electromagnetic pointer of claim 5 further comprising a switch, the switch being configured to partially penetrate through an opening of the first pen tube assembly and to be located on the circuit board for switching a circuit function of the circuit board.

7. The electromagnetic pointer of claim 5, wherein diameters of the first and second pen tube assemblies are about 5.5 mm.

8. The electromagnetic pointer of claim 5, wherein the electromagnetic input apparatus comprises a smart mobile communications device, a digitizer or a tablet and an eBook.

* * * * *